United States Patent
Wirola et al.

(10) Patent No.: US 11,573,089 B2
(45) Date of Patent: Feb. 7, 2023

(54) MULTILEVEL ALTITUDE MAPS

(71) Applicant: HERE Global B.V., Eindhoven (NL)

(72) Inventors: Lauri Aarne Johannes Wirola, Tampere (FI); Pavel Ivanov, Tampere (FI); Henri Jaakko Julius Nurminen, Tampere (FI)

(73) Assignee: HERE Global B.V., Eindhoven (NL)

( * ) Notice: Subject to any disclaimer, the term of this patent is extended or adjusted under 35 U.S.C. 154(b) by 143 days.

(21) Appl. No.: 17/058,568

(22) PCT Filed: May 28, 2018

(86) PCT No.: PCT/EP2018/063936
§ 371 (c)(1),
(2) Date: Nov. 24, 2020

(87) PCT Pub. No.: WO2019/228605
PCT Pub. Date: Dec. 5, 2019

(65) Prior Publication Data
US 2021/0190506 A1  Jun. 24, 2021

(51) Int. Cl.
*G01C 21/20* (2006.01)
*G01C 21/00* (2006.01)
*G01C 5/06* (2006.01)

(52) U.S. Cl.
CPC ............ *G01C 21/206* (2013.01); *G01C 5/06* (2013.01); *G01C 21/005* (2013.01)

(58) Field of Classification Search
CPC ...... G01C 21/206; G01C 5/06; G01C 21/005; G01C 21/32
See application file for complete search history.

(56) References Cited

U.S. PATENT DOCUMENTS 5,345,086 A * 9/1994 Bertram ................. G01C 11/00
                                                         348/E13.06
9,326,105 B2   4/2016 Pattabiraman et al.
(Continued)

FOREIGN PATENT DOCUMENTS

JP         2016148519 A       8/2016
KR    20150104609 A  *  9/2015 ............ H04W 4/023
(Continued)

OTHER PUBLICATIONS

Venkatraman et al., Machine Translation of KR20150104609A Region Determination Control (Year: 2015).*
(Continued)

*Primary Examiner* — Mischita L Henson
(74) *Attorney, Agent, or Firm* — Alston & Bird LLP (57) ABSTRACT

The invention relates to a method, performed by at least one apparatus. The method comprises obtaining sample measurements at least in part comprising altitude information and observed in an area at least in part represented by an altitude map, the altitude map comprising sub-sections representing respective sub-areas of the area; The method further comprises determining altitude estimates from the altitude information. The method further comprises updating one or more altitude estimate distributions associated with respective sub-sections of the altitude map based on the determined altitude estimates. The method further comprises determining, for one or more sub-sections of the altitude map, whether a respective sub-section of the altitude map represents a single level sub-area or multilevel sub-area, based on respective altitude estimate distributions associated with respective sub-sections of the altitude map.

20 Claims, 6 Drawing Sheets

(56) References Cited

U.S. PATENT DOCUMENTS

| | | | |
|---|---|---|---|
| 9,648,458 | B2 | 5/2017 | Mirzaei et al. |
| 9,726,504 | B2 | 8/2017 | Rachuri et al. |
| 2012/0309408 | A1 | 12/2012 | Lukas et al. |
| 2014/0114567 | A1 | 4/2014 | Buchanan et al. |
| 2016/0033266 | A1 | 2/2016 | Le Grand et al. |
| 2016/0102995 | A1 | 4/2016 | Arnold et al. |
| 2018/0252535 | A1* | 9/2018 | Bhimavarapu ........ G01R 33/02 |

FOREIGN PATENT DOCUMENTS

| | | | |
|---|---|---|---|
| WO | WO-2016/054390 A1 | 4/2016 | |
| WO | WO-2016054394 A1 * | 4/2016 | ........... A61B 5/1122 |
| WO | WO-2017/175227 A1 | 10/2017 | |

OTHER PUBLICATIONS

Office Action for Chinese Application No. 201880094035.2 dated Mar. 3, 2022, 13 pages.
Office Action for European Application No. 18729066.3 dated Feb. 22, 2022, 8 pages.
International Search Report and Written Opinion for PCT/EP2018/063936 dated Feb. 13, 2019 (17 pages).

* cited by examiner

MULTILEVEL ALTITUDE MAPS

CROSS-REFERENCE TO RELATED APPLICATIONS

This application is a national phase entry of International Application No. PCT/EP2018/063936, filed May 28, 2018, the entire contents of which are incorporated herein by reference.

FIELD OF THE INVENTION

The invention is related to the field of altitude maps and the creation thereof, which can in particular be used for positioning purposes and in particular for indoor positioning.

BACKGROUND OF THE INVENTION

Indoor positioning requires novel systems and solutions that are specifically developed and deployed for this purpose. The traditional positioning technologies, which are mainly used outdoors, i.e. satellite and cellular positioning technologies, cannot deliver such performance indoors that would enable seamless and equal navigation experience in both environments. The required positioning accuracy (2-3 m), coverage (~100%) and floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years e.g. solutions based on technologies like pseudolites (GPS-like short-range beacons), ultra-sound positioning, Bluetooth or Bluetooth LE signals and Wi-Fi fingerprinting. What is typical to these solutions is that they require either deployment of totally new infrastructure (such as beacons or tags) or manual exhaustive radiosurveying of the buildings including all the floors, spaces and rooms. This is rather expensive and will take a considerable amount of time to build the coverage to the commercially expected level, which can in some cases narrow the potential market segment to only a very thin customer base e.g. for health care or dedicated enterprise solutions. Also, the diversity of these technologies makes it difficult to build a globally scalable indoor positioning solution, and the integration and testing will become complex if a large number of technologies needs to be supported in the consumer devices, such as smartphones.

For an indoor positioning solution to be commercially successful it needs to be globally scalable, have low maintenance and deployment costs, and offer acceptable end-user experience. This can best be achieved, if the solution is based on an existing infrastructure in the buildings and on existing capabilities in the consumer devices. Accordingly, the indoor positioning needs to be based on technologies like Wi-Fi- and/or Bluetooth (BT)-technologies that are already supported in almost every smartphone, tablet, laptop and even in the majority of the feature phones. It is, thus, required to find a solution that uses such radio signals in such a way that makes it possible to achieve 2-3 m horizontal positioning accuracy, close to 100% floor detection with the ability to quickly build the global coverage for this approach.

One approach for radio-based indoor positioning models e.g. the Wi-Fi-radio environment (or any similar radio e.g. Bluetooth) from observed Received Signal Strength (RSS)-measurements as 2-dimensional radiomaps and is hereby able to capture the dynamics of the indoor radio propagation environment in a compressible and highly accurate way. This makes it possible to achieve unprecedented horizontal positioning accuracy with the radio signals only within the coverage of the created radiomaps and also gives highly reliable floor detection.

Huge volumes of indoor radio signal measurement data (so called fingerprints) can be harvested via crowd-sourcing if the consumer devices are equipped with the necessary functionality to enable the radio signal data collection as a background process, naturally with the end-user consent. It could also be possible to use volunteers to survey the sites (buildings) in exchange of reward or recognition and get the coverage climbing up globally in the places and venues important for the key customers. However, the technical challenges related to the harvesting, processing, redundancy, ambiguity and storing the crowd-sourced data need to be understood and solved first, before the radiomap creation can be based on the fully crowd-sourced data.

An essential part in crowd-sourcing of such radio fingerprints is the absolute or relative altitude references of the mobile device and their accuracy. Altitude information is crucial especially indoors where received radio signal strengths in one horizontal location vary drastically as a function of the altitude level. This variation is due to building structures.

There are different approaches for estimating an altitude, such as using global navigation satellite systems (GNSS), using an altitude map, or using a barometer.

Firstly, while GNSS-based altitude estimates work relatively well outdoors in good signal conditions, the estimates are often not available indoors, and when they are, they have an accuracy of about 50 meters, which is not acceptable for indoor floor-level localization accuracy.

Secondly, while the altitude can be estimated based on an altitude map, this only works well in locations where the altitude is unambiguous, i.e. where there is just one ground altitude and no multilevel structures.

Thirdly, a barometer may provide high-resolution pressure measurements which can be used to estimate altitude changes. However, this also requires knowing a reference altitude very accurately.

SOME EXAMPLE EMBODIMENTS OF THE INVENTION

Thus, certain aspects or embodiments of the invention may allow for an improved creating or updating of altitude maps, specifically altitude maps representing areas with multilayer structures. Certain aspects or embodiments of the invention may also have the advantage of allowing for a reliable detection of multilayer structures in received measurement data. Certain aspects or embodiment may further have the advantage of improving the GNSS and barometer altitude estimation without the need for external altitude map information.

According to an exemplary aspect of the invention, a method is disclosed, performed by at least one apparatus, the method comprising:

obtaining sample measurements at least in part comprising altitude information and observed in an area at least in part represented by an altitude map, the altitude map comprising sub-sections representing respective sub-areas of the area;

determining altitude estimates from the altitude information;

updating one or more altitude estimate distributions associated with respective sub-sections of the altitude map based on the determined altitude estimates;

determining, for one or more sub-sections of the altitude map, whether a respective sub-section of the altitude map represents a single level sub-area or multilevel sub-area, based on respective altitude estimate distributions associated with respective sub-sections of the altitude map.

The method may for instance be performed and/or controlled by an apparatus, for instance by a mobile device and/or a server, e.g. an apparatus according to the exemplary aspects.

According to a further exemplary aspect of the invention an apparatus is disclosed, comprising means for performing a method according to the exemplary aspect of the invention. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory.

Optionally, the apparatus may comprise various other components, like a communication interface, a network interface, a radio interface, a data interface, a user interface etc.

According to a further exemplary aspect of the invention, an alternative apparatus is also disclosed comprising at least one processor and at least one memory including computer program code; the at least one memory and the computer program code configured to, with the at least one processor, cause the apparatus to at least perform a method according to the exemplary aspect of the invention.

The above-disclosed apparatuses according to any aspect of the invention may be a module or a component for a device, for example a chip. Alternatively, the disclosed apparatus according to any aspect of the invention may be a device, for instance a mobile device or a server. The disclosed apparatus according to any aspect of the invention may comprise only the disclosed components, for instance means, processor, memory, or may further comprise one or more additional components.

According to a further exemplary aspect of the invention, a computer program code is disclosed, the computer program code, when executed by a processor, causing an apparatus to perform a method according to the exemplary aspect of the invention.

The computer program may be stored on computer-readable storage medium, in particular a tangible and/or non-transitory medium. The computer readable storage medium could for example be a disk or a memory or the like. The computer program could be stored in the computer readable storage medium (e.g. according to the exemplary aspect of the invention) in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a third aspect of the invention, a non-transitory computer readable storage medium in which computer program code is stored, the computer program code when executed by a processor causing at least one apparatus to perform a method according to the exemplary aspect of the invention. The storage medium may be a tangible storage medium, for example a tangible computer-readable storage medium. The storage medium may be a storage medium of a mobile device, for example an apparatus according to the exemplary aspects of the invention.

In the following, exemplary features and exemplary embodiments of all aspects of the present invention will be described in further detail.

The obtained sample measurements comprise altitude information. The sample measurements may be observed with an apparatus, which is typically a mobile device or mobile terminal, such as a smartphone, a smart watch, a tablet, a notebook or the like. The apparatus may be the apparatus performing the method or a separate apparatus. The sample measurements may in particular be observed in a crowd-sourcing process. Thus, a plurality of sample measurements (e.g. tracks comprising the same) may be observed from a plurality of mobile devices. The observed sample measurements may then be sent from a respective mobile device to a central and remote server, for instance. The altitude information may be representative of the altitude of the apparatus at the time the apparatus has observed the sample measurements. The altitude information may take different forms and may in particular be representative of e.g. relative or absolute altitudes or altitudes of different units, as will be explained in more detail below.

In addition to the altitude information, the sample measurements preferably comprise additional information. For instance, the sample measurements may comprise information on a horizontal position, e.g. a horizontal position estimate. For instance, the sample measurements may comprise measurements of signals allowing for determining a horizontal position, such as GNSS signals and/or signals of inertial sensors, such as a gyroscope and/or an accelerometer. The sample measurements may also comprise radio measurements (e.g. received signal strength measurements) of the radio environment, for instance of cellular signals, WiFi signals and/or Bluetooth signals. While radio measurements from the latter signals may generally also aid in the determination of a position, the necessary information for utilizing the radio measurements for positioning is typically not yet present in an early surveying phase of an area. The sample measurements may generally be referred to as fingerprints.

The area, in which the sample measurements were observed or taken, is at least in part (or completely) represented by an altitude map. The area may comprise outside and/or insides parts. The area, at least in one or more sub-areas, may in particular comprise multilevel structures, such as multistory buildings, bridges, tunnels, and multilevel roads. An altitude map may be understood to be a (e.g. two dimensional) digital representation of the area indicating altitude values for respective horizontal positions. The altitude map may be a topographic map. The altitude map comprises (e.g. may be divided into) sub-sections representing respective (horizontal) sub-areas of the area. Each sub-section may represent a substantially rectangular sub-area of the area. The altitude map may comprise one or more altitude values for at least some (preferably each) of the sub-sections. Each sub-section may be realized by a data element at least comprising respective one or more altitude values. Thus, a respective sub-section (and thus a respective sub-area) is associated with respective one or more altitude values. For instance, the sub-sections of the map are defined such that the altitude in a respective sub-area represented by the sub-section of the map can be assumed to be constant. For example, the sub-sections may represent sub-areas with a length and/or width of not more than e.g. 200 meters, preferably not more than 100 meters.

Preferably, the sample measurements at least in part form a track in the area. That the sample measurements form at least in part a track in the area (and thus in the altitude map) may be understood to mean that the positions described by the position information (e.g. altitude information and/or horizontal position information) comprised by the sample measurements form a track. The track may be a substantially continuous track. Thus, the sample measurements may not only be observed sporadically. Rather they are observed substantially continuously. For instance, a sample measurement may be taken at least once per minute, preferably at least once per 10 seconds. The track may thus intersect at least one of the sub-areas (and thus sub-sections of the altitude map). If the track intersects a sub-section of the map, at least one sample measurement may have been observed in the respective sub-area associated with the sub-section (and thus at least one altitude estimate may be determined for the sub-section). The method steps described herein may in particular be performed (e.g. at least) for those sub-areas or sub-sections, which the track intersects.

The determination of the altitude estimates may depend on the kind of altitude information comprised by the obtained sample measurements. For instance, the altitude estimates may be derived or calculated from the altitude information, e.g. by combining or correcting the altitude information, as will be explained in more detail below.

An altitude estimate distribution may in particular comprise multiple altitude estimates, e.g. from different measurements observed in the same sub-area. An altitude estimate distribution may thus be understood as an empirical distribution of altitude estimates obtained in a respective sub-area. Thus, some or all of the sub-sections may be associated with a respective altitude distribution for that respective sub-section of the altitude map. The altitude estimate distributions may be considered as a part of the altitude map. Updating an altitude estimate distribution based on a determined altitude estimate may in particular comprise adding a determined altitude estimate to the altitude estimate distribution. It may regularly be the case, that there are multiple sample measurements (e.g. of a single track) observed in a single sub-area and thus also multiple altitude estimates to be added to a single altitude estimate distribution of a respective sub-section associated with the respective sub-area. On the other hand, for a single track, there may regularly also be sub-areas, which are not intersected by the track. For instance, only those altitude estimate distributions may be updated for which an altitude estimate was determined, that is those altitude estimate distributions which are associated with a sub-section of the map, which the track intersects. Thus, not all altitude estimate distributions may necessarily be updated.

Based on respective altitude estimate distributions associated with respective sub-sections of the altitude map, it is then determined for at least one sub-section of the altitude map whether a respective sub-section of the altitude map represents a single level sub-area or multilevel sub-area.

A single level sub-area may be understood as an area where one can stay generally at a single altitude level, e.g. a flat outside area or an inside area of a single floor building. A multilevel area may be understood as an area where one can stay at more than one altitude level, e.g. an outside area with a structure, such as a bridge, an undercrossing, a multilevel road, or an inside area of a multistory building. A single level area may also be seen as a single layer area or a single floor area. Accordingly, a multilevel area may also be seen as a multilayer, a multi-floor or a multi-story area.

The determining whether a certain sub-section represents a single level or multi-level sub-area (i.e. the detection of a "multilayerness" or "singlelayerness" of the sub-area) may be based on a mathematical algorithm or mathematical functions, as will be described in further detail below. The determination may for instance be realized by determining the number of levels of a certain sub-area represented by a respective sub-section. For instance, if it is determined that a certain sub-area comprises one level, a single level sub-area is determined. For instance, if it is determined that a certain sub-area comprises more than one (e.g. two, three, four, five, etc.) levels, a multilevel sub-area is determined.

It shall be noted that the determining, whether a respective sub-section of the altitude map represents a single level sub-area or multilevel sub-area, is preferably performed based on the altitude estimate distributions, which already have been updated based on the determined altitude estimates.

The information whether a certain sub-section of the altitude map represents a single-level sub-area or a multilevel subarea can advantageously be used, e.g. implemented in the altitude map, as will be described in more detail below. Specifically, the altitude map can be enhanced with such information, leading to improved altitude estimation, when such an enhanced altitude map is used for positioning purposes. It is particularly advantageous, as the determination of multilayer structures and the updating of the altitude map in the disclosed method does not require any external information other than the obtained sample measurements (fingerprints). That is, the altitude map can be created and updated in a self-contained process without the need for further external data about the environment.

The invention thus solves a key problem with altitude maps of the prior art, which do not sufficiently learn the altitude profiles of the structures only from the observed sample measurements. However, the urban environment regularly consists of multilevel structures such as multistory buildings, bridges, tunnels, and multilevel roads. Detecting and automatically creating altitude maps representing such multilevel areas is in particular critical for two reasons. Firstly, without knowing about the multilayerness in a multilevel area an altitude map-matching (i.e. shifting the altitude estimates of the obtained sample measurements such that the altitude matches best with the altitude map, which will also be explained in more detail below) cannot be done reliably due to the altitude map information being ambiguous. Secondly, features of a radio signals, such as the received signal strength, that are used for (horizontal) positioning, vary significantly from one layer to another in different altitude levels at the same horizontal position due to the radio signals attenuation caused by the structures. This affects the eventual performance of positioning systems based on the radio signals. Therefore, in such areas a respective radiomap shall include a layer structure that sufficiently represents the layers of the actual multilayer structure. Therefore, to support positioning in areas with multi-level structures, the disclosed method allows for an altitude map to automatically learn and contain several altitude values for a given location, not just one.

According to an exemplary embodiment of all aspects of the invention, the altitude information of the sample measurements comprises first and second altitude information. At least some, preferably each obtained sample measurement (if available at the time of observing the sample measurement) comprises first and second altitude information. The first and second altitude information may be two different and preferably independent types of altitude information. The first and second altitude information may particularly be based on two different sources (e.g. different sensors) for obtaining altitude information. Obtaining sample measurements with first and second altitude information may increase the reliability and preciseness of the altitude estimate determined based on the altitude information.

According to an exemplary embodiment of all aspects of the invention, the first altitude information of the sample measurements is absolute altitude information, in particular a satellite based altitude information.

The absolute altitude information may be indicative of an absolute value of an altitude. The absolute altitude information may for instance be determined by obtaining (e.g. receiving) or calculating from received signals an absolute altitude value. The absolute altitude information may for instance comprise at least one absolute altitude value associated with a vertical position such as an absolute height value (e.g. in meters or feet), above a reference height, such as the ground or the sea level. Satellite based altitude information is understood to be absolute altitude information which has been determined based on a satellite system. A satellite system is for example a Global Navigation Satellite System (GNSS) such as "Global Positioning System" (GPS), "Galileo", "Global Navigation Satellite System" (i.e. "Globalnaja Nawigazionnaja Sputnikowaja Sistema", GLONASS), "BeiDou Navigation Satellite System" (BDS), or "Quasi-Zenith Satellite System" (QZSS), to name some examples.

According to an exemplary embodiment of all aspects of the invention, the second altitude information of the sample measurements is relative altitude information, in particular a pressure based altitude information.

The relative altitude information may for instance be indicative of altitude changes, i.e. altitude deltas. The relative altitude information may be obtained from a sensor of the device observing the sample measurements. The relative altitude information may for instance be or be based on one or more pressure measurements (e.g. by a barometric sensor), which are indicative of an ambient pressure and an ambient pressure change. The relative altitude information is particularly advantageous for continuing determining altitude estimations after a (e.g. direct) determining of the absolute altitude information becomes unavailable or the absolute altitude information becomes ambiguous, e.g. because the current position is inside a building or inside other multilayer constructions.

The relative altitude information (e.g. based on barometer measurements) can thus be used to stabilize and filter the altitude changes and allows for extending an altitude estimation capability also to areas where no absolute altitude information (e.g. neither GNSS nor an altitude map) is available, which is often the case for indoor areas. For instance, if (absolute) altitude information is known very accurately outside of a building, altitude changes indoors can be estimated using the relative altitude information, e.g. from a barometer.

According to an exemplary embodiment of all aspects of the invention, the determining of altitude estimates for updating the altitude estimate distributions comprises combining first and second altitude information of the sample measurements. A combining of altitude information may comprise a fusing of the altitude information or a mapping of one altitude information onto the other altitude information. In one example, the relative altitude information is mapped onto only temporarily (e.g. only initially and/or intermittently) available absolute altitude information. For instance, the relative and absolute altitude information may be used to determine a substantially continuous track indicative of an altitude profile over time and/or space. Example methods of combining the first and second altitude information is described in more detail below.

According to an exemplary embodiment of all aspects of the invention, the combining of first and second altitude information of respective sample measurements comprises using a filter algorithm, in particular a Rauch-Tung-Striebel smoother. A filter algorithm, such as a Kalman filter (also referred to as "linear quadratic estimation"), has the advantage of intelligently combining the absolute and relative altitude information in order to obtained reliable altitude estimates. The altitude information is a series of measurements observed over time and contain inaccuracies (e.g. statistical noise). The filtering can produce estimates of the actual altitude (altitude estimates) that tend to be more accurate than those based on a single measurement alone. For this the Kalman filtering estimates a joint probability distribution over the variables for each timeframe. It is particularly preferred to use a fixed interval smoother, such as the Rauch-Tung-Striebel (RTS) smoother, which is an efficient two-pass algorithm for fixed interval smoothing. However other smoothers may also be applied, such as the Modified Bryson-Frazier smoother or the Minimum-variance smoother. These algorithms are basically based on a state-space model, where the state is one-dimensional and includes only the altitude. In particular in case of the RTS smoother, the model includes a state transition model and a measurement model. Therein, the state transition model describes the change of the altitude over time, and can be based on the relative altitude information (e.g. provided by barometer measurements). The measurement model, on the other hand, describes the absolute altitude information (e.g. provided by GNSS-based measurements). For the model, it may also be assumed that the horizontal position is known at each time instant. The corresponding horizontal position may also be derived from the sample measurements, which may also comprise e.g. GNSS measurements for horizontal positioning and (in order to compensate for unavailable GNSS signals) inertial sensor measurements.

According to an exemplary embodiment of all aspects of the invention, the method further comprises:
  determining that a sub-section of the altitude map represents a multilevel sub-area by determining that the altitude estimate distribution associated with the respective sub-section of the altitude map is a multimodal distribution.

A multimodal (altitude estimate) distribution may in particular be understood to be a distribution, wherein one or more variables of the altitude estimate distribution can be described by a (e.g. one dimensional) probability distribution which has two or more modes, i.e. two or more local maxima or distinct peaks. A multi-modal distribution may in particular be an at least bi-modal distribution. The number of modes of the distribution associated with the sub-section of the altitude map may then indicate the number of levels, layers or floors of the sub-area represented by the sub-section. If a multimodality is determined, it can be assumed that the respective sub-section of the altitude map represents a multilevel sub-area.

It is noted that it may not (yet) be known at the time of performing the method, whether the sub-section represents a multilevel or single level sub-area.

According to an exemplary embodiment of all aspects of the invention, the method further comprises:
  determining that a sub-section of the altitude map represents a single level sub-area by determining that the altitude estimate distribution associated with the respective sub-section of the altitude map is a unimodal distribution.

A unimodal (altitude estimate) distribution may in particular be understood to be a distribution, wherein one or more variables of the altitude estimate distribution can be described by a (e.g. one dimensional) probability distribution which has only a single mode, i.e. one local maximum or distinct peak. If a unimodality is determined, it can be assumed that the respective sub-section of the altitude map represents a single level sub-area.

According to an exemplary embodiment of all aspects of the invention, the method further comprises
  utilizing a clustering approach for determining whether a sub-section of the altitude map represents a single level sub-area or a multilevel sub-area.

The altitude estimate distribution (or the respective altitude estimates thereof) is used as an input for the clustering approach, which may be performed for at least a part of a respective altitude estimate distribution. A clustering approach may in particular comprise a cluster analysis. A cluster analysis (which may also be seen as a cluster search) is in particular understood to be grouping a set of objects (e.g. the altitude estimates of the altitude estimate distribution) in such a way that objects in the same group (i.e. cluster) are more similar (e.g. with respect to one or more properties) to each other than to those in other groups (i.e. clusters). As a result at least a part of the altitude estimates of the altitude estimate distribution is associated with a respective cluster. In case only one cluster is determined in the clustering approach, a unimodal distribution may be assumed. In case more than one cluster is determined in the clustering approach, a multimodal distribution may be assumed. Thus, a cluster may be understood to be representative of a mode of the respective unimodal or multimodal distribution.

As explained, at least the altitude estimates of the altitude estimate distributions are used as an input for the clustering approach. However, additional information may also be used as inputs for the clustering approach.

According to an exemplary embodiment of all aspects of the invention, the clustering approach comprises an expectation maximization algorithm.

An expectation-maximization (EM) algorithm is understood to be an iterative method to find a maximum likelihood or maximum a posteriori (MAP) estimates of parameters in statistical models. Basically, the EM iteration alternates between performing an expectation (E) step (creating a function for the expectation of the likelihood evaluated using the current estimate for the parameters), and a maximization (M) step (computing parameters maximizing the expected likelihood found on the E step).

In one example, the expectation-maximization algorithm may assume a Gaussian mixture. In that case a Gaussian mixture density with a given number of mixture components (equaling the number of clusters and thus the number of levels or layers) is fit to the empirically obtained altitude estimate distribution. The number of mixture components is determined as the number that minimizes an objective function that rewards good fitness to the empirical altitude distribution and penalizes increasing the number of mixture components. Examples of such objective functions include e.g. the Akaike information criterion, the Bayesian information criterion, and the Deviance information criterion. Each mixture component (e.g. the mode, median or mean value of the mixture component) can then indicate the altitude value of a respective level or layer.

According to an exemplary embodiment of all aspects of the invention, the method further comprises:
  in case a sub-section of the altitude map represents a single level sub-area, determining a single altitude value based on the altitude estimate distribution associated with the respective sub-section of the altitude map to be used as the altitude value for the respective sub-section of the altitude map.

As explained above, if the altitude estimate distribution associated with the sub-section of the altitude map is determined to be a unimodal distribution and/or to comprise a single cluster, the sub-section of the altitude map is assumed to represent a single level sub-area. The respective determined mode or cluster can be used to determine a single altitude value, which may for instance be an average, a mean, a median or a mode value of the determined mode, cluster or mixture. The single altitude value can be used for the respective sub-section of the altitude map. Using an altitude value for a sub-section of the altitude map may for instance comprise associating the altitude value with the sub-section of the altitude map.

It is noted that in particular if there are only few sample measurements (that is few altitude estimates) for a certain sub-section, the sub-section may also erroneously be identified as representing a single level sub-area. However, as more and more sample measurements are collected, the correct result will eventually be reached by the described method.

According to an exemplary embodiment of all aspects of the invention, the method further comprises:
  in case a sub-section of the altitude map represents a multilevel sub-area, determining multiple altitude values based on the altitude estimate distribution associated with the respective sub-section of the altitude map to be used as the altitude values for the respective sub-section of the altitude map.

As explained above, if the altitude estimate distribution associated with the sub-section of the altitude map is determined to be a multimodal distribution and/or to comprise multiple clusters, the sub-section of the altitude map is assumed to represent a multilevel sub-area. The respective determined modes or clusters can be used to determine multiple altitude values, which may in each case for instance be an average, a mean, a median or a mode value of the respective mode, cluster or mixture. The altitude values can be used for the respective sub-section of the altitude map. Using altitude values for a sub-section of the altitude map may for instance comprise associating all determined altitude values with the sub-section of the altitude map.

Additionally or alternatively, the number of levels or layers may also be determined and associated with the respective sub-section of the altitude map.

According to an exemplary embodiment of all aspects of the invention, the method further comprises:
  updating the altitude map with altitude values determined based on the altitude estimate distributions.

The altitude map can thus be advantageously updated with altitude values determined based on the already updated altitude estimate distributions. As already explained, updating the altitude map may in particular comprise associating the one (in case of a single level area) or more (in case of a multilevel area) determined altitude values with respective sub-sections of the altitude map. Due to the multiple altitude values for a single sub-section of the altitude map, the altitude map may also be considered a multi valued altitude map. The method may thus in particular be understood to be a method of creating or updating the altitude map.

According to an exemplary embodiment of all aspects of the invention, the determining of the altitude estimates comprises correcting the altitude estimates based on altitude values of sub-sections of the altitude map.

The altitude map used for correcting the altitude estimates may be a previous altitude map, which for instance has been learned based on previously retrieved sample measurements. For instance, the (previous) altitude map used for the correction is not yet updated with the altitude values determined based on the also not yet updated altitude estimate distributions. A correction of the altitude estimates may comprise a fusing of the altitude estimates with altitude values of the (previous) altitude map. For instance, the altitude estimates may be corrected (e.g. shifted) with regard to the altitude, so that they best align with altitude values indicated by the altitude map. For instance, the altitude estimates of the obtained sample measurements of the track are shifted such that the track's altitude matches best with the altitude map.

In other words, the altitude map is used for correcting the altitude estimates. The altitude estimates are then used for updating the altitude estimate distribution, which in turn is preferably used for updating the altitude map. This is a preferred way of realizing a self-contained updating of altitude maps without the need of any additional external altitude information.

According to an exemplary embodiment of all aspects of the invention, for correcting the altitude estimates based on altitude values of sub-sections of the altitude map, altitude values of those sub-sections of the altitude map, which have been identified as representing multilevel sub-areas, are discarded.

For instance, if a sub-section of the altitude map is associated with multiple altitude values, the respective sub-section is identified as representing a multilevel sub-area. As the altitude map is ambiguous with regard to altitude clause in the sub-sections representing multi-level areas, these altitude values advantageously do not influence the correction of the altitude estimates. Rather, only single level or potentially single level sub-areas are used as basis for the correction. Thus, the altitude map is only used for correcting the altitude estimates for sub-sections where the sub-sections of the altitude map are (potentially) unambiguous.

According to an exemplary embodiment of all aspects of the invention, for correcting the altitude estimates based on altitude values of sub-sections of the altitude map, altitude values of some or all of those sub-sections of the altitude map, for which the respective altitude estimate distribution associated with the respective sub-section of the altitude map comprises a number of altitude estimates above a predefined threshold and/or below a predefined threshold, are discarded.

If the number of altitude estimates of an altitude estimate distribution is, on the one hand, above a predefined threshold it is possible to detect a respective multilayerness for that altitude estimate distribution. In particular, altitude values are in this case preferably discarded only if the respective altitude estimate distribution comprises a number of altitude estimates above a predefined threshold and is also multimodal (i.e. indicates a multilevel sub-area), because in that case the multimodality can be considered as sufficiently certain.

If the number of altitude estimates of an altitude estimate distribution is, on the other hand, below a predefined threshold, the altitude estimate distribution can be assumed to lack sufficient measurement information. Considering such an altitude estimate distribution, may be counterproductive for the intended correction.

Thus, in a preferred embodiment only altitude values of those sub-sections are considered for the correction, for which the respective altitude estimate distribution comprises a number of altitude estimates between a lower bound and an upper bound. Nevertheless, altitude values of sub-sections for which the respective altitude estimate distribution comprises a number of altitude estimates that exceeds the upper bound but which is detected to be unimodal, may also be used. In the interval between the lower bound and the upper bound, there are enough altitude estimates so that the altitude map is good enough to be used for correcting the altitude, but there are not sufficient altitude estimates for determining a potential ambiguity or multilayerness.

In this way, it can be achieved that, by means of the correction, the altitude estimates of the obtained sample measurements (e.g. of a track) are shifted such that altitude (e.g. of the track) matches best with the altitude map particularly in those sub-area or sub-sections where altitude map is most probably unambiguous (i.e. represents a single level sub-area).

According to an exemplary embodiment of all aspects of the invention, for correcting the altitude estimates based on altitude values of sub-sections of the altitude map, altitude values of those sub-sections of the altitude map, for which there is an indication that the sub-section represents a multilayer area, are discarded.

Such an additional indication, that the sub-section represents a multilayer area, may for instance be that a satellite signal (e.g. a GNSS signal) is unavailable in the sub-area. Alternatively or additionally, other indications may also be used, such as for example a high statistical spread of the altitude estimates of the altitude estimate distribution, as will be explained in more detail below.

According to an exemplary embodiment of all aspects of the invention, correcting the altitude estimates based on altitude values of sub-sections of the altitude map accounts for the statistical spread of the altitude estimates and/or the altitude estimate distributions associated with the respective sub-sections of the altitude map.

A statistical spread may for instance be the variance of the altitude estimate distribution. The statistical spread may be accounted for by weighting the altitude value of the altitude map inversely (e.g. inversely proportional) to the statistical spread (e.g. the variance) of the altitude estimate distribution associated with the respective sub-section of the altitude map. Thus, altitude values of the altitude map with a high statistical spread have a lower influence on the correction than altitude values of the altitude map with a lower statistical spread. In this regard, the method may thus further comprise: determining a statistical spread for one or more of the altitude estimate distributions. Advantageously, the statistical spread may for instance be the measurement noise variance of the Rauch-Tung-Striebel smoother and may thus be an output of the Rauch-Tung-Striebel smoother.

The described weighting is particularly advantageous in the initial phase, where there are typically not yet sufficient many altitude estimates to actually detect any multilayerness. In order to compensate for this, multilevel sub-areas can be indicated by a large statistical spread of the altitude estimate distributions.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

The following description serves to deepen the understanding of the present invention and shall be understood to complement and be read together with the description as provided in the above summary section of this specification.

Figure 1:
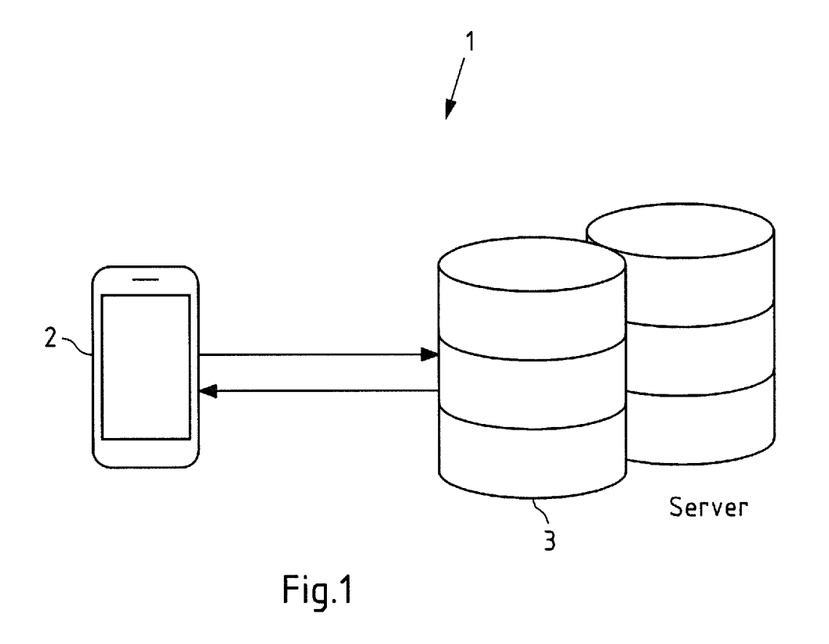
FIG. 1 is a block diagram of a system of exemplary apparatuses according to the invention.

FIG. 1 is a block diagram of a system 1 of a mobile device 2 and a server 3, which may both be exemplary embodiments of an apparatus according to the invention and which may separately or together perform exemplary embodiments of the method according to the invention. The details of mobile device 2 and server 3 are described with respect to FIG. 2, which is an exemplary block diagram of the mobile device 1 of FIG. 1, and FIG. 3, which is an exemplary block diagram of the server 3 of FIG. 1.

For instance, the mobile device 2 may be a part of or may be a cellular phone, a personal digital assistant, a laptop computer, a tablet computer or a wearable. Server 3 may be a server located remote from mobile device 2, for instance. Server 3 may also comprise multiple devices and/or may be realized as a computer cloud, for instance.

Figure 2:
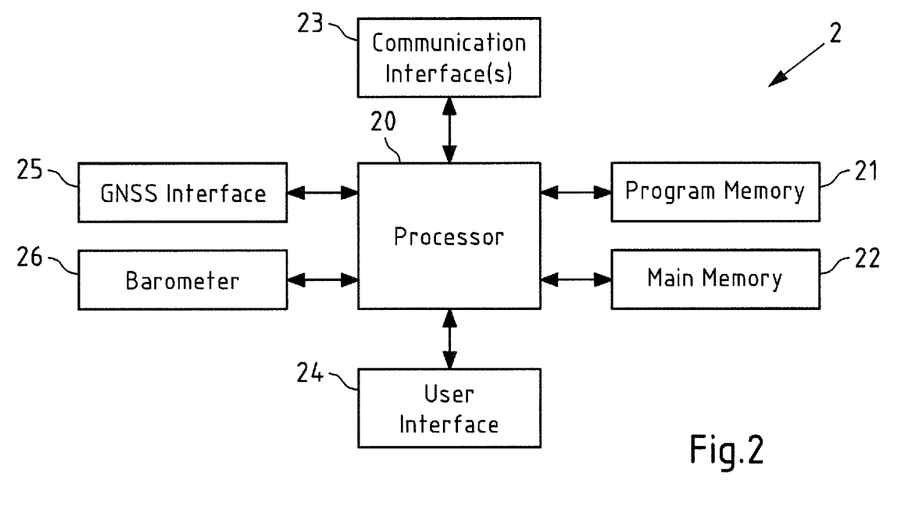
FIG. 2 is a block diagram of the mobile device of FIG. 1.

Turning now to FIG. 2, the mobile device 2 may be configured to determine absolute altitude information, e.g. based on signals from a Global Navigation Satellite System (GNSS). However, in particular for indoor situations, there may be no reception of GNSS signals, the GNSS signals may be too weak in order to get reliable location information or the GNSS signals suggest a reliable position estimate in fact the quality is poor. Thus, the mobile device 2 may also be configured for determining relative altitude information, e.g. based on pressure information. Apart from that, the mobile device is also capable of determining horizontal position information, which may also be based on signals from a GNSS and/or inertial sensors of the mobile device. Further, the mobile device is also capable of observing measurements of the radio environment. The described information may be comprised by sample measurements or "fingerprints". The described capabilities of the mobile device will also be described below.

The mobile device 2 comprises a processor 20. Processor 20 may represent a single processor or two or more processors, which are for instance at least partially coupled, for instance via a bus. Processor 20 executes a program code stored in program memory 21 (for instance program code causing mobile device 2 to perform embodiments of the method according to the invention, when executed on processor 20), and interfaces with a main memory 22. Some or all of memories 21 and 22 may also be included into processor 20. One of or both of memories 21 and 22 may be fixedly connected to processor 20 or at least partially removable from processor 20, for instance in the form of a memory card or stick. Program memory 21 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 21 may also comprise an operating system for processor 20. Program memory 21 may for instance comprise a first memory portion that is fixedly installed in mobile device 2, and a second memory portion that is removable from mobile device 2, for instance in the form of a removable SD memory card. Main memory 22 may for instance be a volatile memory. It may for instance be a RAM or DRAM memory, to give but a few non-limiting examples. It may for instance be used as a working memory for processor 20 when executing an operating system and/or programs. One or more tracks of sample measurements that are observed by mobile device 2 may for instance be stored in program memory 21 and or main memory 22.

Processor 20 further controls a communication interface 23 configured to receive and/or output information. For instance, communication interface 23 may be configured to send and/or receive data to/from server 3. Mobile device 2 may be configured to communicate with server 3 of system 1 (see FIG. 1). This may for instance comprise sending information such as the observed tracks comprising sample measurements observed by the mobile device 2 to server 3. The communication may for instance be based on a (e.g. partly) wireless connection. The communication interface 23 may thus comprise circuitry such as modulators, filters, mixers, switches and/or one or more antennas to allow transmission and/or reception of signals, e.g. for the communication with server 3. In embodiments of the invention, communication interface 23 is inter alia configured to allow communication according to a 2G/3G/4G/5G cellular communication system and/or a non-cellular communication system, such as for instance a WLAN network. Nevertheless, the communication route between mobile device 2 and server 3 may equally well at least partially comprise wire-bound portions. For instance, server 3 may be connected to a back-bone of a wireless communication system (associated with mobile terminal 2) via a wire-bound system such as for instance the internet.

Processor 20 further controls a user interface 24 configured to present information to a user of mobile device 20 and/or to receive information from such a user, such as manually input position fixes or the like. User interface 24 may for instance be the standard user interface via which a user of mobile device 2 controls other functionality thereof, such as making phone calls, browsing the Internet, etc.

Processor 20 may further control a GNSS interface 25 configured to receive positioning information, that is in particular (absolute) altitude information and (absolute) horizontal position information, of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). It should be noted that, even in case mobile device 2 has a GNSS interface 25, the user of mobile device 2 can still benefit from using positioning technologies based on other approaches, such as the approach based on pressure measurements for the altitude information and/or inertial sensors for the horizontal position described herein, since these technologies may provide a higher accuracy in challenging environments for GNSS-based technologies. For this, the mobile device may also comprise one or more respective inertial sensors (not shown).

In preferred embodiments, the mobile device 2 further comprises a barometer 26. For this, processor 10 further controls the barometer 26 as an example for a pressure measurement instrument. The barometer 26 measures the ambient pressure at (or close to) the location of the mobile device. Thus, mobile device may automatically and/or repeatedly obtain pressure information. The barometer 26 may be used for obtaining relative altitude information.

The components 21-26 of mobile device 2 may for instance be connected with processor 20 by means of one or more serial and/or parallel busses.

Figure 3:
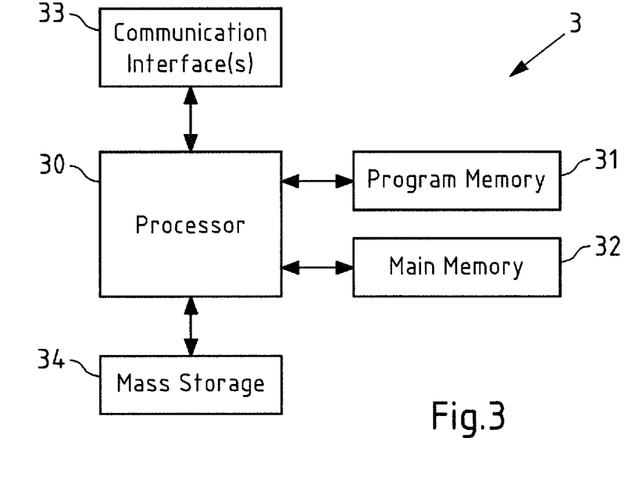
FIG. 3 is a block diagram of the server of FIG. 1.

Turning now to FIG. 3, an exemplary block diagram of server 3 of FIG. 1 is shown. Similarly to FIG. 2, server 3 comprises a processor 30. Processor 30 may represent a single processor or two or more processors, which are for instance at least partially coupled, for instance via a bus. Processor 30 executes a program code stored in program memory 31 (for instance program code causing server 3 to perform embodiments of the method according to the invention, when executed on processor 30). Processor 30 further interfaces with a main memory 32 (for instance acting as a working memory) and a mass storage 34, which may for instance collect and store a plurality of tracks comprising sample measurements collected by mobile devices (such as mobile device 2).

Processor 30 further controls a communication interface 33 configured to receive and/or output information. For instance, server 3 may be configured to communicate with mobile device 2 of system 1, as described.

Figure 4:
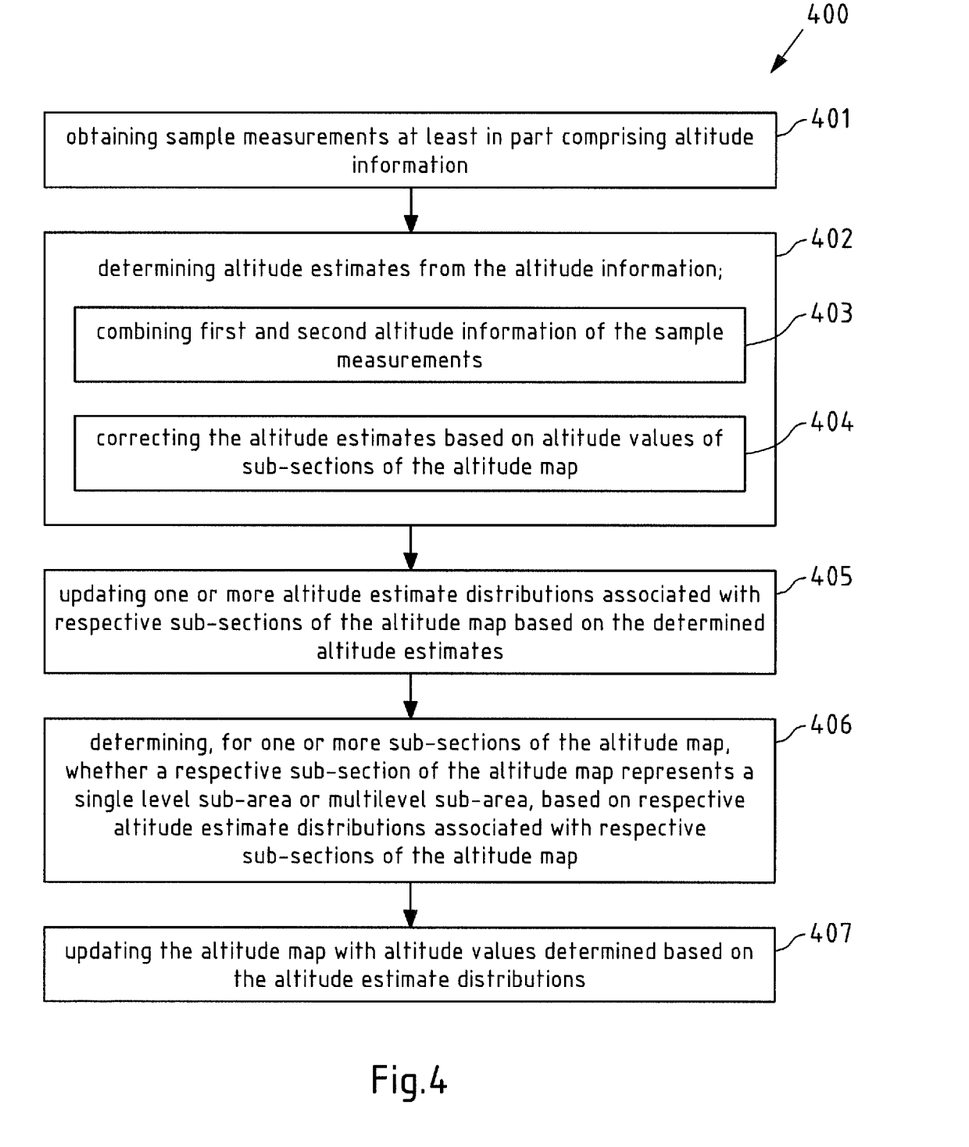
FIG. 4 is flow chart illustrating an example embodiment of a method according to the invention.

FIG. 4 is flow chart 400 illustrating an example embodiment of a method according to the invention. The method illustrated in FIG. 4 is in the example performed by server server 3 of FIG. 1. A user has surveyed the area and the track of sample measurements have been observed by mobile device 2 and sent to server 3.

The method of FIG. 4 will be explained in the following in connection with FIGS. 5 to 7.

A server thus obtains (e.g. receives) sample measurements at least in part comprising altitude information and observed in the survey area at least in part represented by an altitude map (action 401).

An exemplary illustration of an altitude map 601 is shown in the diagram 600 of FIG. 6, which will also be explained further below. Therein, the sample measurements at least in part form a track 603 in the area and the altitude map 601 comprises a plurality of sub-sections 602 representing respective sub-areas of the surveyed area. It is preferred to use the full track, because only then the barometer-based pressure changes can be used to improve the GNSS based absolute altitude information from sample to sample. In other words, the approach should not be used, when there are only sporadic individual samples. Some or each of the sub-sections 602 may already be associated with or comprise one or more altitude values (e.g. determined in a previous cycles of the described method) indicating respective one or more heights of the sub-areas represented by the sub-sections 602.

From the altitude information, which comprises GNSS based absolute altitude information and pressure measurement based relative altitude information altitude estimates are determined (action 402).

Action 402 comprises combining the relative and absolute altitude information of the sample measurements, e.g. by using a smoother algorithm such as the Rauch-Tung-Striebel smoother (action 403). These algorithms are based on a state-space model, where the state is one-dimensional and includes only the altitude. This model includes the state transition model and measurement model. The state transition model describes the change of the altitude over time, and it is based on the delta altitude information provided by the barometer. The measurement model, on the other hand, describes the GNSS-based altitude measurements. It is also assumed that the horizontal position is known at each time instant based on GNSS and inertial sensor measurements.

Figure 5:
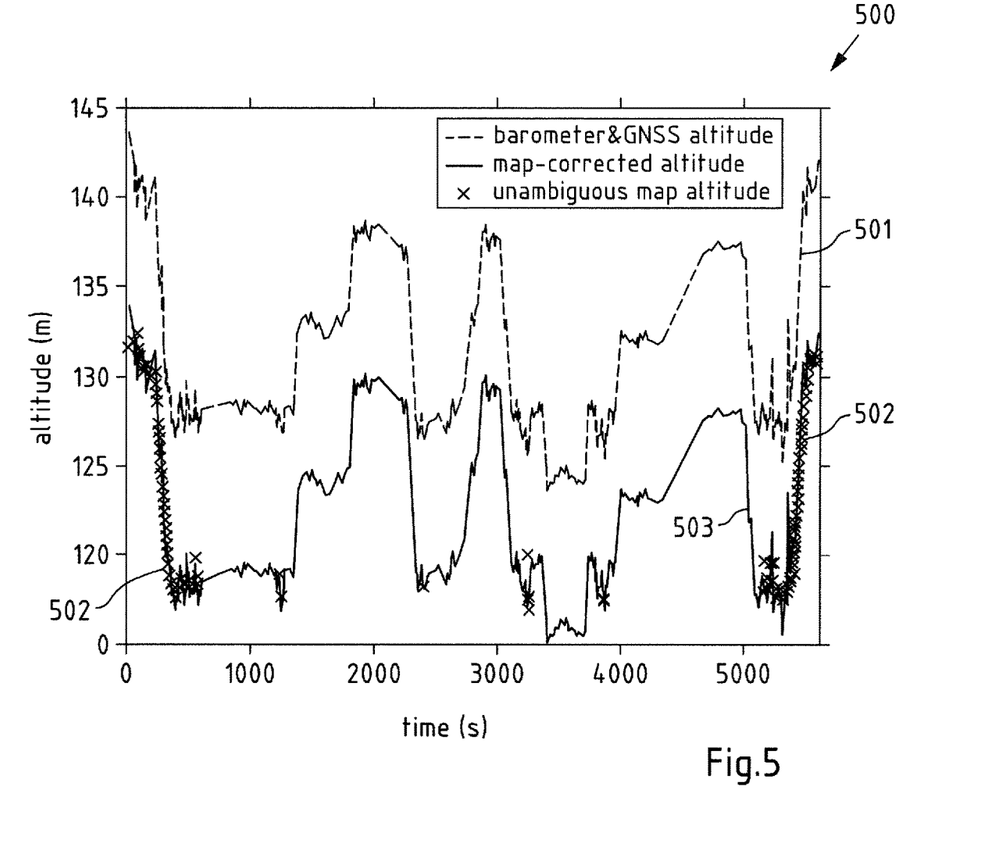
FIG. 5 is a schematic diagram illustrating an exemplary correction of altitude estimates.
Figure 6:
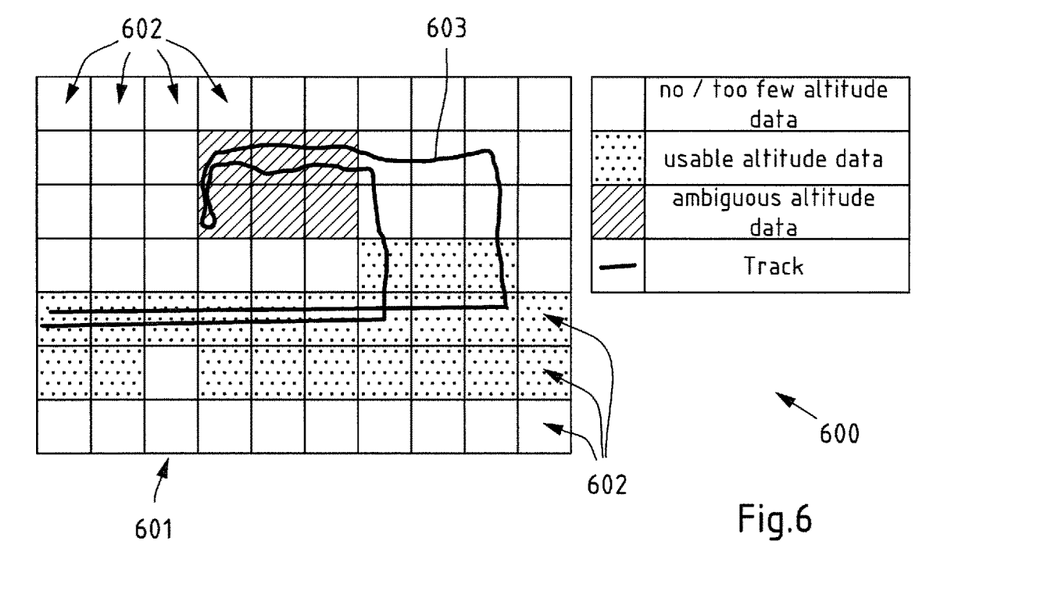
FIG. 6 is a schematic diagram illustrating an exemplary altitude map with sub-sections and an exemplary track.

Exemplary altitude estimates 501 resulting from action 403 are illustrated in the diagram 500 of FIG. 5. The diagram 500 shows in a dashed line the determined height values (in meters) of the altitude estimates 501 over the time at which they (or the respective sample measurements) were observed (in seconds).

Action 402 further comprises correcting the altitude estimates 501 based on the altitude values of sub-sections of the altitude map 600 (action 404). Altitude values used for the correction are displayed in FIG. 5 as crosses "x" 502.

For the correction of the altitude estimates 501 not all available altitude values of the altitude map 601 are used, because the altitude map 601 may also comprise sub-sections 602 which represent multilevel sub-areas, i.e. sub-section 602 which are ambiguous with respect to the altitude data. Using altitude values of such sub-sections would deteriorate the result of the correction. Such ambiguous sub-sections 602 are shown as hatched sub-sections 602 in FIG. 6 and are discarded for the correction. Also, sub-sections 602, for which only very few sample measurements and thus altitude estimates) are available, are discarded as they are potentially unambiguous. Such sub-sections 602 are shown in FIG. 6 as plain sub-sections 602.

As a result, only the altitude values for those sub-sections, for which the altitude value with a sufficient certainty is unambiguous (sub sections representing single level sub-areas), are used for the correction. Those sub-sections 602 of the altitude map 601 which can be used for such a correction are shown as dotted sub-sections 602 in FIG. 6. The dotted sub-section may for instance be outdoor areas.

It is noted, that also the dotted sub-sections 602, for which the altitude value is assumed to be unambiguous with a sufficient certainty may nevertheless turn out to be ambiguous (that is represent multilevel sub-areas) later on. Thus, the process of correction may also account for the statistical spread (e.g. variance) of the used altitude estimate distributions associated with the respective sub-sections of the altitude map, because a larger variance may indicate a potential unambiguity. Thus the altitude values of the sub-sections used for correction (dotted sub-sections 602) may be weighted with the corresponding variance. For instance, these altitude values are weighted with weights inversely proportional to the altitude estimate variance when correcting the new track's altitude estimates. For example, the altitude sample variances can be used as measurement noise variances in the Rauch-Tung-Striebel smoother. This weighting is important in the initial phase where there are in general not sufficiently many samples measurements to detect the "multilayerness", and (potential) multilevel sub-areas can only be identified by larger altitude estimate variances.

Additionally or alternatively, other indicators of multi-layer structures can also be used to discard certain altitude values of the altitude map. For example, an altitude map correction should not be applied when the GNSS position is not available due to insufficient visibility of the GNSS satellites.

With a high probability, this procedure matches the new track's altitude estimates with the altitude values of the altitude map in the unambiguous sub-areas. The purpose is to make the altitude estimation accurate enough so that the multilevel sub-areas and their level altitudes can be detected.

As a result of the correction 404, the track of altitude estimates 501 is shifted to be in line with the altitude values 502 of the altitude map 601. The corrected tack of altitude estimates 503 to be used further in the method is illustrated with a solid line in FIG. 5.

Then, the altitude estimate distributions associated with respective sub-sections 602 of the altitude map are updated based on the newly determined (corrected) altitude estimates 503 by adding the altitude estimates 503 to the altitude estimate distributions for those sub-sections, which the track intersects (action 405). The attitude estimates may be weighted with weights inversely proportional to the respective variances of the altitude estimates. Such variances can be obtained as an output of the Rauch-Striebel-Smoother algorithm. In this way, those tracks that have been corrected with a reliable altitude map will be given more weight than non-corrected tracks. When enough tracks have been accumulated in the considered area, the altitude sample distribution tends to converge to a narrow peak in sub-sections where the altitude is unambiguous and to multiple narrow peaks in sub-sections representing a multilevel sub-area.

Particularly for the updated altitude estimate distributions associated with respective sub-sections of the altitude map, it can now be determined, for the respective sub-sections 602 of the altitude map 601, whether a respective sub-section 602 of the altitude map 601 represents a single level sub-area or multilevel sub-area (action 406).

In case a sub-section 602 of the altitude map 601 represents a single level sub-area, a single altitude value based on the altitude estimate distribution associated with the respective sub-section 602 of the altitude map 601 is used as the altitude value for the respective sub-section 602 of the altitude map 601.

In case a sub-section 602 of the altitude map 601 represents a multilevel sub-area, multiple altitude values based on the altitude estimate distribution associated with the respective sub-section 602 of the altitude map 601 are used as the altitude values for the respective sub-section 602 of the altitude map 601.

Figure 7:
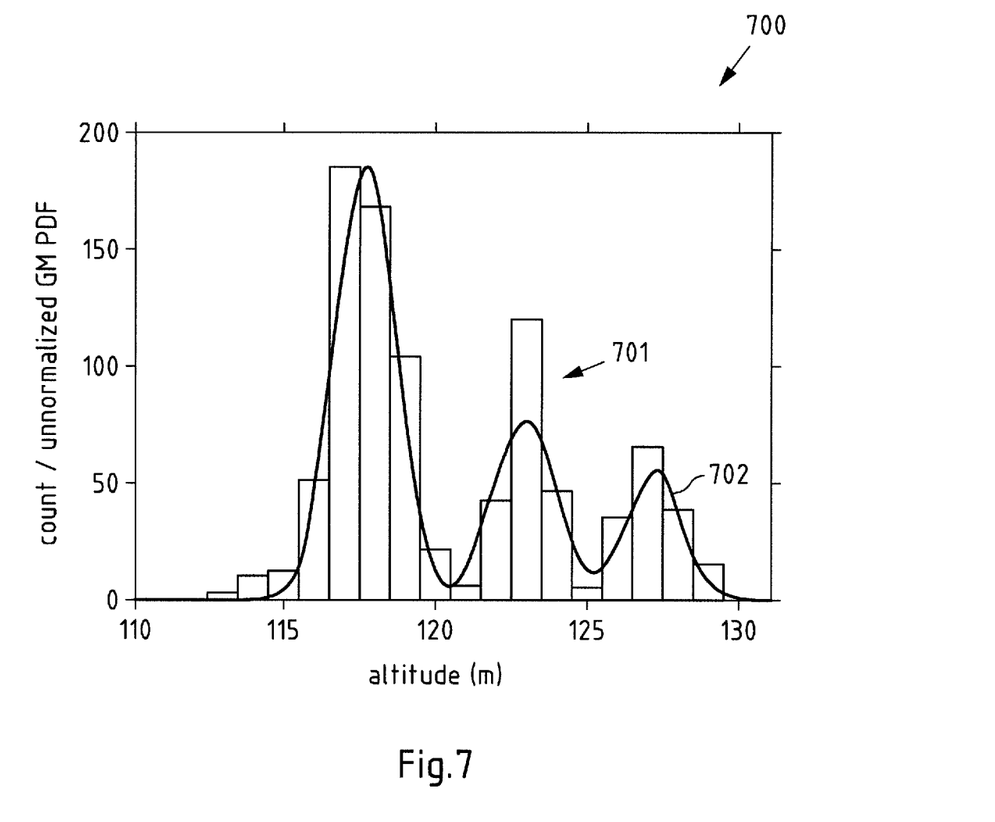
FIG. 7 is a schematic diagram illustrating an example of an altitude estimate distribution.

Diagram 700 of FIG. 7 illustrates an example of an altitude estimate distribution 701 of a three-story building, which is in this case illustrated as a histogram with the count of respective determined altitude estimates over the altitude (in meters). By means of an expectation maximization based clustering algorithm it can be determined, if the altitude estimate distribution 701 is unimodal or multimodal. This can be done using an expectation-maximization (EM) algorithm to fit a Gaussian mixture density with a given number of mixture components to the empirical altitude estimate distribution. The altitude of each mixture component is then considered as the altitude of a level or layer. The number of mixture components is determined as the number that minimizes an objective function that rewards good fitness to the empirical altitude estimate distribution and penalizes increasing the number of mixture components. Such objective functions include e.g. Akaike information criterion, Bayesian information criterion, and Deviance information criterion.

FIG. 7 illustrates the resulting fit 702 of the distribution, detecting three modes or a mixture of three distributions, which is interpreted as three floor levels.

Each sub-section 602 of the altitude map 601 maintains such an empirical distribution 701 of altitude estimates obtained in the given sub-area. These distributions are constantly updated with new crowd-sourced tracks. The end product, i.e. the crowd-sourced altitude map 601, consists then of respective average values of these altitude estimate distributions 701 in each sub-section 602.

Now, the altitude map 601 can be updated with altitude values determined based on the algorithm analyzing respective altitude estimate distributions 701 (action 407).

Accordingly, the proposed method is based on first correcting the altitude estimates along the track 603 with a possible prior altitude map 601 (learned based on previously retrieved information) and then using the track 603 to improve the altitude estimate distributions 701 and thereby the crowd-sourced altitude map 601 further.

As a result, the proposed method can learn a detailed multi-valued altitude map and improves the altitude estimation of barometer and GNSS capable devices without external altitude map information. This can be used for 3-dimensional crowd-sourcing based radio mapping, for example.

Figure 8:
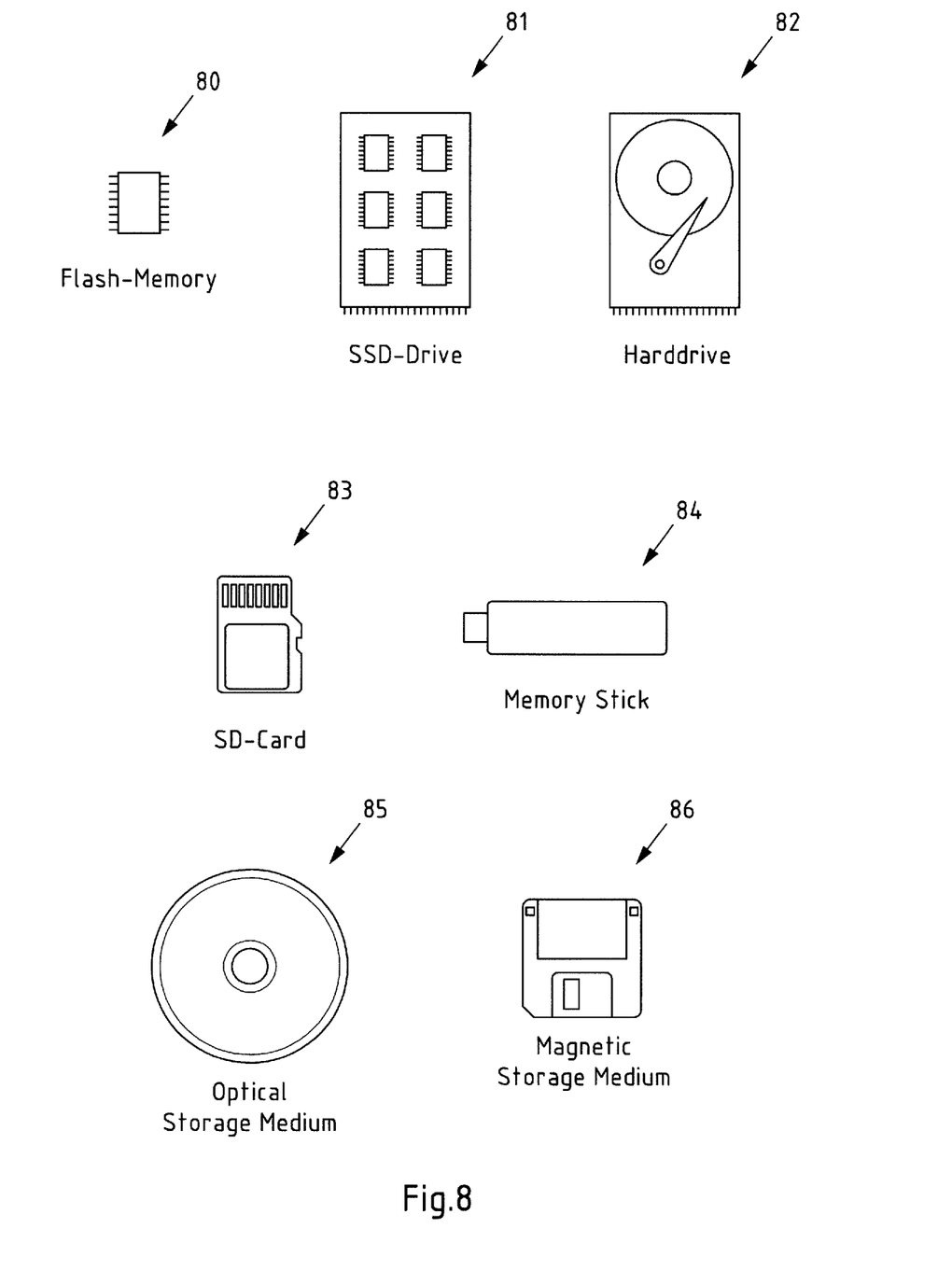
FIG. 8 is a schematic illustration of examples of tangible storage media according to the invention.

FIG. 8 is a schematic illustration of examples of tangible storage media according to the present invention, that may for instance be used to implement program memory 21 of FIG. 2 and/or program memory 31 of FIG. 3. To this end, FIG. 8 displays a flash memory 80, which may for instance be soldered or bonded to a printed circuit board, a solid-state drive 81 comprising a plurality of memory chips (e.g. Flash memory chips), a magnetic hard drive 82, a Secure Digital (SD) card 83, a Universal Serial Bus (USB) memory stick 84, an optical storage medium 85 (such as for instance a CD-ROM or DVD) and a magnetic storage medium 86.

The following embodiments shall also be considered disclosed:

1. A method, performed by at least one apparatus, the method comprising:
   obtaining sample measurements at least in part comprising altitude information and observed in an area at least in part represented by an altitude map, the altitude map comprising sub-sections representing respective sub-areas of the area;
   determining altitude estimates from the altitude information;
   updating one or more altitude estimate distributions associated with respective sub-sections of the altitude map based on the determined altitude estimates;
   determining, for one or more sub-sections of the altitude map, whether a respective sub-section of the altitude map represents a single level sub-area or multilevel sub-area, based on respective altitude estimate distributions associated with respective sub-sections of the altitude map.
2. The method of claim 1, wherein the sample measurements at least in part forming a track in the area.
3. The method of embodiment 1 or 2, wherein the altitude information of the sample measurements comprises first and second altitude information.
4. The method of embodiment 3, wherein the first altitude information of the sample measurements is absolute altitude information, in particular a satellite based altitude information.
5. The method of embodiment 3 or 4, wherein the second altitude information of the sample measurements is relative altitude information, in particular a pressure based altitude information.
6. The method of any of embodiments 3 to 5, wherein the determining of altitude estimates for updating the altitude estimate distributions comprises combining first and second altitude information of the sample measurements.
7. The method of any of embodiments 3 to 6, wherein the combining of first and second altitude information of respective sample measurements comprises using a filter algorithm, in particular a Rauch-Tung-Striebel smoother.
8. The method of any of the preceding embodiments, the method further comprising:
   determining that a sub-section of the altitude map represents a multilevel sub-area by determining that the altitude estimate distribution associated with the respective sub-section of the altitude map is a multimodal distribution.
9. The method of any of the preceding embodiments, the method further comprising:
   determining that a sub-section of the altitude map represents a single level sub-area by determining that the altitude estimate distribution associated with the respective sub-section of the altitude map is a unimodal distribution.
10. The method of any of the preceding embodiments, wherein the method further comprises
    utilizing a clustering approach for determining whether a sub-section of the altitude map represents a single level sub-area or a multilevel sub-area.
11. The method of any of the preceding embodiments, wherein the clustering approach comprises an expectation maximization algorithm.
12. The method of any of the preceding embodiments, the method further comprising:
    in case a sub-section of the altitude map represents a single level sub-area, determining a single altitude value based on the altitude estimate distribution associated with the respective sub-section of the altitude map to be used as the altitude value for the respective sub-section of the altitude map.
13. The method of any of the preceding embodiments, the method further comprising:
    in case a sub-section of the altitude map represents a multilevel sub-area, determining multiple altitude values based on the altitude estimate distribution associated with the respective sub-section of the altitude map to be used as the altitude values for the respective sub-section of the altitude map.
14. The method of embodiment 12 or 13, the method further comprising:
    updating the altitude map with altitude values determined based on the altitude estimate distributions.
15. The method of any of the preceding embodiments, wherein the determining of the altitude estimates comprises correcting the altitude estimates based on altitude values of sub-sections of the altitude map.
16. Method of embodiment 15, wherein, for correcting the altitude estimates based on altitude values of sub-sections of the altitude map, altitude values of those sub-sections of the altitude map, which have been identified as representing multilevel sub-areas, are discarded.
17. The method of embodiment 15 or 16, wherein, for correcting the altitude estimates based on altitude values of sub-sections of the altitude map, altitude values of some or all of those sub-sections of the altitude map, for which the respective altitude estimate distribution associated with the respective sub-section of the altitude map comprises a number of altitude estimates above a predefined threshold and/or below a predefined threshold, are discarded.
18. Method of any of embodiments 15 to 17, wherein, for correcting the altitude estimates based on altitude values of sub-sections of the altitude map, altitude values of those sub-sections of the altitude map, for which there is an indication that the sub-section represents a multilayer area, are discarded.
19. The method of any of embodiments 15 to 18, wherein correcting the estimates information based on altitude values of sub-sections of the altitude map accounts for the statistical spread of the altitude estimates and/or the altitude estimate distributions associated with the respective sub-sections of the altitude map.
20. An apparatus comprising means for performing a method according to any of embodiments 1 to 19.
21. An apparatus comprising at least one processor and at least one memory including computer program code, the at least one memory and the computer program code configured to, with the at least one processor, cause the apparatus to at least perform the method of any of embodiments 1 to 19.
22. A computer program code, the computer program code, when executed by a processor, causing an apparatus to perform the method of any of the embodiments 1 to 19.
23. A non-transitory computer readable storage medium in which computer program code is stored, the computer program code when executed by a processor causing at least one apparatus to perform the method of any of embodiments 1 to 19.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method, performed by at least one apparatus, the method comprising:
    obtaining sample measurements at least in part comprising altitude information and observed in an area at least in part represented by an altitude map, the altitude map comprising sub-sections representing respective sub-areas of the area;
    determining altitude estimates from the altitude information;
    updating one or more altitude estimate distributions associated with respective sub-sections of the altitude map based on the determined altitude estimates;
    determining, for one or more sub-sections of the altitude map, whether a respective sub-section of the altitude map represents a single level sub-area or multilevel sub-area, based on respective altitude estimate distributions associated with respective sub-sections of the altitude map; and
    updating the altitude map with respective indications of whether the one or more sub-sections of the altitude map are single level sub-areas or multilevel sub-areas, respectively, wherein the altitude map is configured for use in determining a position estimate comprising an altitude component.

2. The method of claim 1, wherein the sample measurements at least in part forming a track in the area.

3. The method of claim 1, wherein the altitude information of the sample measurements comprises first and second altitude information.

4. The method of claim 3, wherein the first altitude information of the sample measurements is absolute altitude information, in particular a satellite based altitude information.

5. The method of claim 3, wherein the second altitude information of the sample measurements is relative altitude information, in particular a pressure based altitude information.

6. The method of claim 3, wherein the determining of altitude estimates for updating the altitude estimate distributions comprises combining first and second altitude information of the sample measurements.

7. The method of claim 6, wherein combining the first and second altitude information of respective sample measurements comprises using a filter algorithm, in particular a Rauch-Tung-Striebel smoother.

8. The method of claim 1, the method further comprising:
    determining that a sub-section of the altitude map represents a multilevel sub-area by determining that the altitude estimate distribution associated with the respective sub-section of the altitude map is a multimodal distribution.

9. The method of claim 1, the method further comprising:
    determining that a sub-section of the altitude map represents a single level sub-area by determining that the altitude estimate distribution associated with the respective sub-section of the altitude map is a unimodal distribution.

10. The method of claim 1, wherein the method further comprises:
    utilizing a clustering approach for determining whether a sub-section of the altitude map represents a single level sub-area or a multilevel sub-area.

11. The method of claim 10, wherein the clustering approach comprises an expectation maximization algorithm.

12. The method of claim 1, the method further comprising:
    in case a sub-section of the altitude map represents a single level sub-area, determining a single altitude value based on the altitude estimate distribution associated with the respective sub-section of the altitude map to be used as the altitude value for the respective sub-section of the altitude map.

13. The method of claim 1, the method further comprising:
    in case a sub-section of the altitude map represents a multilevel sub-area, determining multiple altitude values based on the altitude estimate distribution associated with the respective sub-section of the altitude map to be used as the altitude values for the respective sub-section of the altitude map.

14. The method of claim 12, the method further comprising:
    updating the altitude map with altitude values determined based on the altitude estimate distributions.

15. The method of claim 1, wherein the determining of the altitude estimates comprises correcting the altitude estimates based on altitude values of sub-sections of the altitude map.

16. The method of claim 15, wherein, for correcting the altitude estimates based on altitude values of sub-sections of the altitude map, altitude values of those sub-sections of the altitude map, which have been identified as representing multilevel sub-areas, are discarded.

17. The method of claim 15, wherein, for correcting the altitude estimates based on altitude values of sub-sections of the altitude map, altitude values of some or all of those sub-sections of the altitude map, for which the respective altitude estimate distributions associated with the respective sub-sections of the altitude map comprises a number of altitude estimates above a predefined threshold and/or below a predefined threshold, are discarded.

18. The method of claim 15, wherein, for correcting the altitude estimates based on altitude values of sub-sections of the altitude map, altitude values of those sub-sections of the altitude map, for which there is an indication that the sub-section represents a multilayer area, are discarded.

19. The method of claim 15, wherein correcting the estimates information based on altitude values of sub-sections of the altitude map accounts for the statistical spread of the altitude estimates and/or altitude estimate distributions associated with the respective sub-sections of the altitude map.

20. An apparatus comprising at least one processor and at least one memory including computer program code, the at least one memory and the computer program code configured to, with the at least one processor, cause the apparatus to:

obtain sample measurements at least in part comprising altitude information and observed in an area at least in part represented by an altitude map, the altitude map comprising sub-sections representing respective sub-areas of the area;

determine altitude estimates from the altitude information;

update one or more altitude estimate distributions associated with respective sub-sections of the altitude map based on the determined altitude estimates;

determine, for one or more sub-sections of the altitude map, whether a respective sub-section of the altitude map represents a single level sub-area or multilevel sub-area, based on respective altitude estimate distributions associated with respective sub-sections of the altitude map; and update the altitude map with respective indications of whether the one or more sub-sections of the altitude map are single level sub-areas or multilevel sub-areas, respectively, wherein the altitude map is configured for use in determining a position estimate comprising an altitude component.

* * * * *